(No Model.)

R. C. WRIGHT.
HAIR CLIPPER.

No. 448,901. Patented Mar. 24, 1891.

Witnesses:
E. P. Ellis
Joseph M. Nesbitt

Inventor
R. C. Wright
per Lehmann & Pattison,
Att'ys.

UNITED STATES PATENT OFFICE.

RICHARD C. WRIGHT, OF KOLEEN, INDIANA.

HAIR-CLIPPER.

SPECIFICATION forming part of Letters Patent No. 448,901, dated March 24, 1891.

Application filed December 6, 1890. Serial No. 373,779. (No model.)

*To all whom it may concern:*

Be it known that I, RICHARD C. WRIGHT, of Koleen, in the county of Greene and State of Indiana, have invented certain new and useful Improvements in Hair and Wool Clippers; and I do hereby declare the following to be a full, clear, and exact description of the invention, such as will enable others skilled in the art to which it pertains to make and use it, reference being had to the accompanying drawings, which form part of this specification.

My invention relates to an improvement in hair-clippers; and it consists in the combination and construction of parts, which will be fully described hereinafter, and pointed out in the claims.

The object of my invention is to provide a cheap and simple device for clipping the hair and wool from animals of all kinds, and in which the cutters are made self-sharpening by being held forcibly in contact with the teeth.

Figure 1:
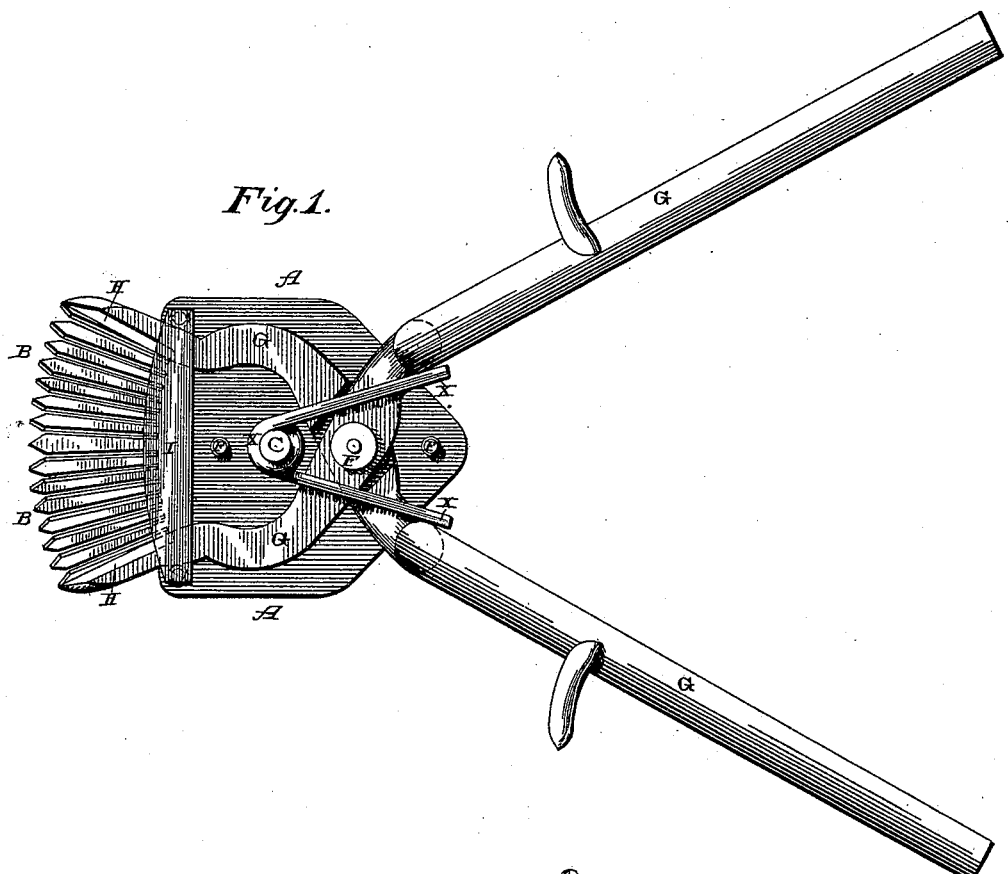
Figure 2:
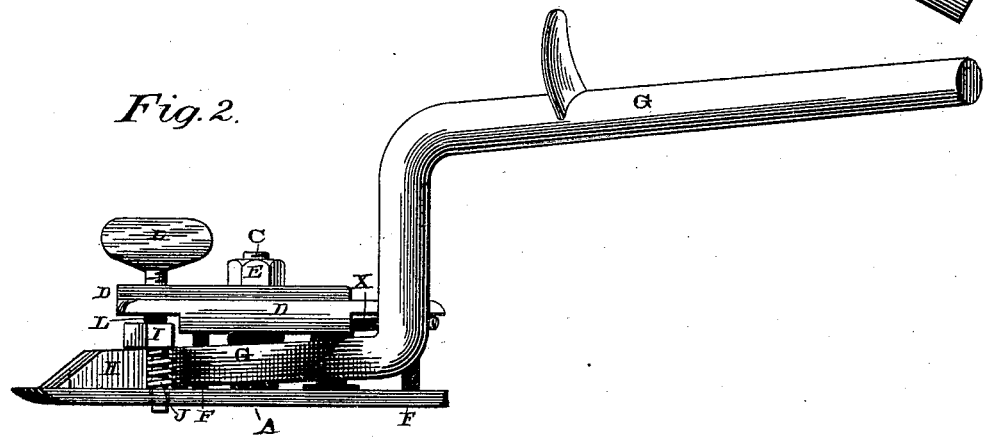

Figure 1 is a plan view of a clipper which embodies my invention, the top plate being removed. Fig. 2 is a side elevation of the same.

A represents the base-plate, upon which the other parts are mounted, and which has the teeth B formed upon its front end. Projecting from this plate is a central screw-threaded bolt C, which extends up through the top plate D and receives the nut E upon its upper end for the purpose of holding the top plate tightly in position. Also rising from this base-plate are a number of guiding-rods F, that serve to keep the top plate C in line with the base-plate A. Upon one of these rods are pivoted the two levers G, which have their front ends formed into cutters H, as shown. These levers may be given the shape here shown, or any other that may be preferred, and the cutters are beveled upon their inner sides and made flat upon their lower sides, where they move back and forth over the teeth B. As these cutters move over the teeth they cut the hair which extends up through them. The movement of these cutters over the top of the teeth serves to sharpen the cutting-edges of the cutters. For the purpose of keeping the cutters constantly in contact with the teeth the pressure-bar I is used, and this bar has its two ends turned at right angles, so as to pass down through openings in the base-plate A, and applied to these turned-down ends are the springs J, which serve to force the bar outward out of contact with the upper edges of the cutters, when the bar is left free to move. Passing down through the top plate is the set-screw L, which has its lower end to bear directly upon the top of the pressure-bar, and thus regulate the pressure of the cutters upon the teeth at the will of the operator. The more sharply it is desired that the cutters shall cut the hair that extends above the top edges of the teeth, the more the set-screw is tightened for the purpose of increasing the pressure of the cutters upon the teeth, and thus take up all wear that may have occurred between the cutters and the comb. Placed upon the central clamping-bolt is a wire or other suitable spring X, which has its ends to extend between the handles, and thus force them apart whenever they are left free to move.

Clippers constructed as here shown are cheap, simple, easily operated, and are not liable to get out of repair, and should the parts become worn they can be quickly tightened and made as good as new.

Having thus described my invention, I claim—

1. In a hair-cutter, a frame having an upper and lower plate, one of said plates having projecting teeth, levers pivoted between the plates having projecting cutters, which extend over the teeth, and a pressure-bar between one of the said plates and the cutters, the parts combined to operate substantially as shown.

2. The combination of a base-plate having a comb formed upon its outer end, a top plate, a clamping-bolt which passes through the two plates and holds the parts in position, the pivoted levers provided with cutters upon their front ends, the pressure-bar, and a set-screw for regulating the pressure of the bar upon the cutters, substantially as described.

In testimony whereof I affix my signature in presence of two witnesses.

RICHARD C. WRIGHT.

Witnesses:
GARRISON LAWRENCE,
WALTER HAYES.